July 15, 1924.
A. G. RONNING ET AL
1,501,621
DITCHING MACHINE
Filed June 23, 1923
8 Sheets-Sheet 1
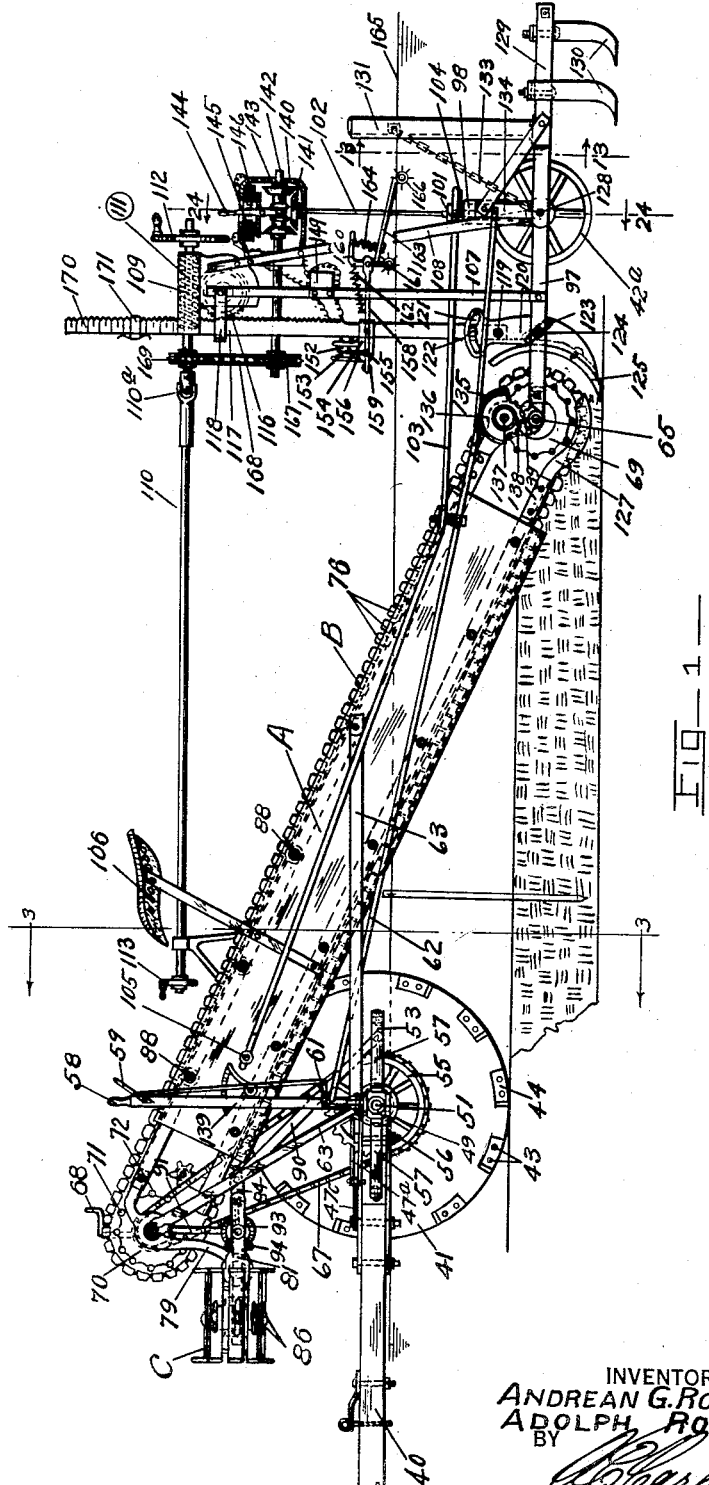
Fig. 1
INVENTOR
ANDREAN G. RONNING
ADOLPH RONNING
BY
ATTORNEY

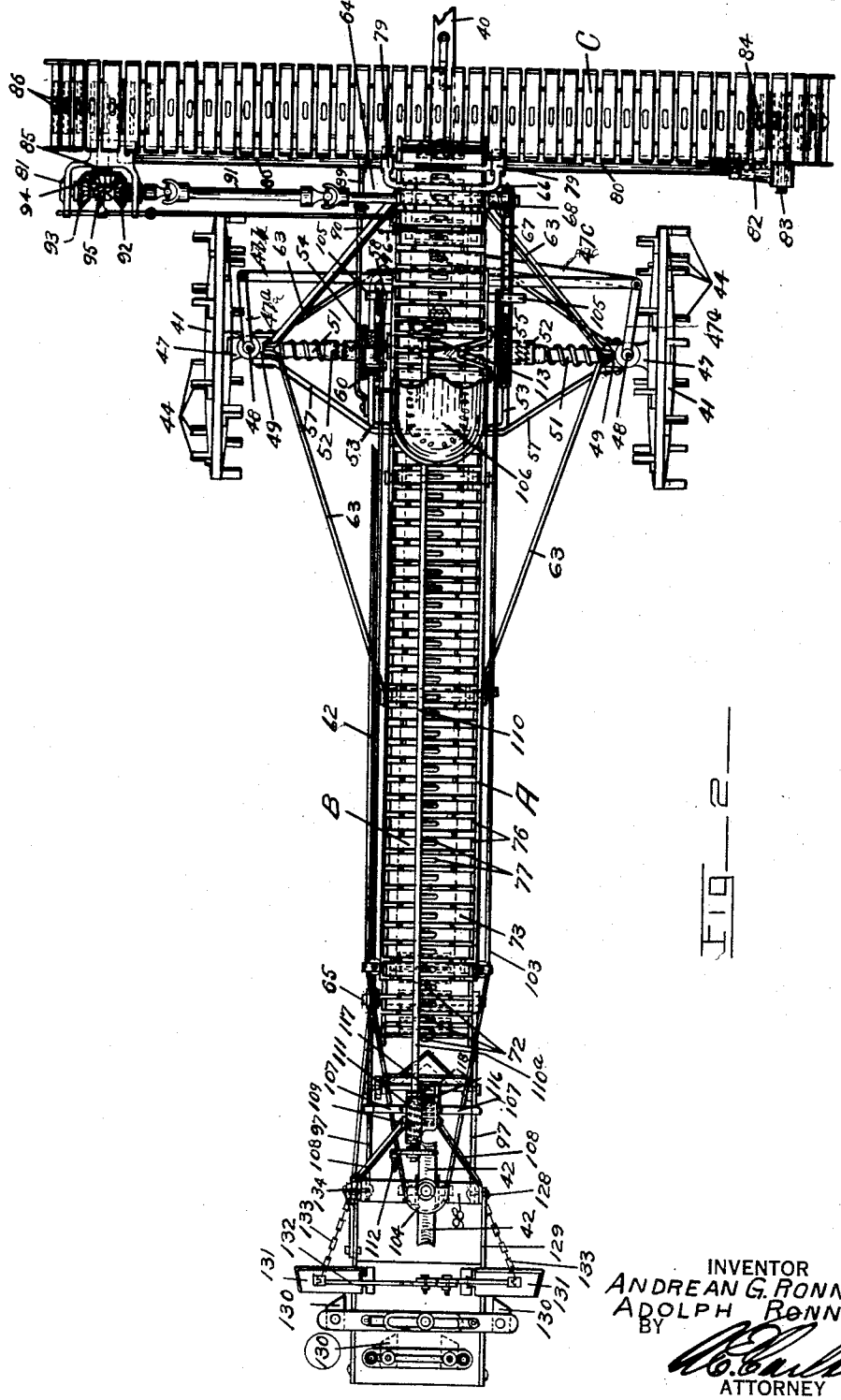

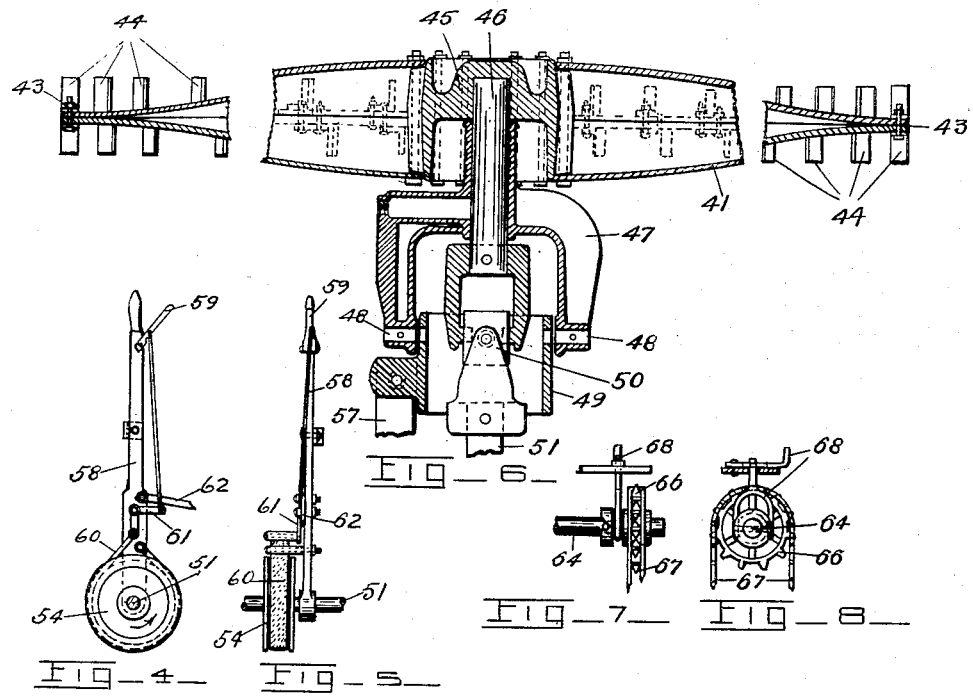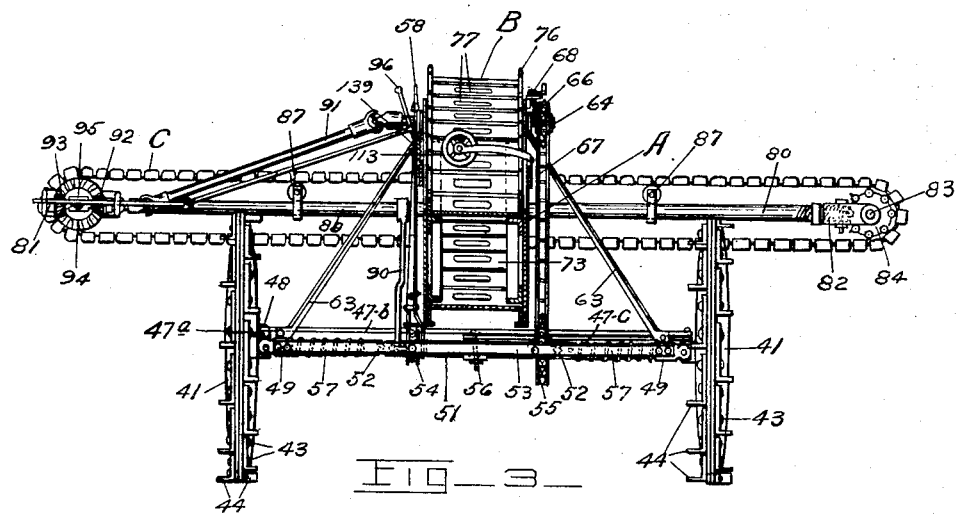

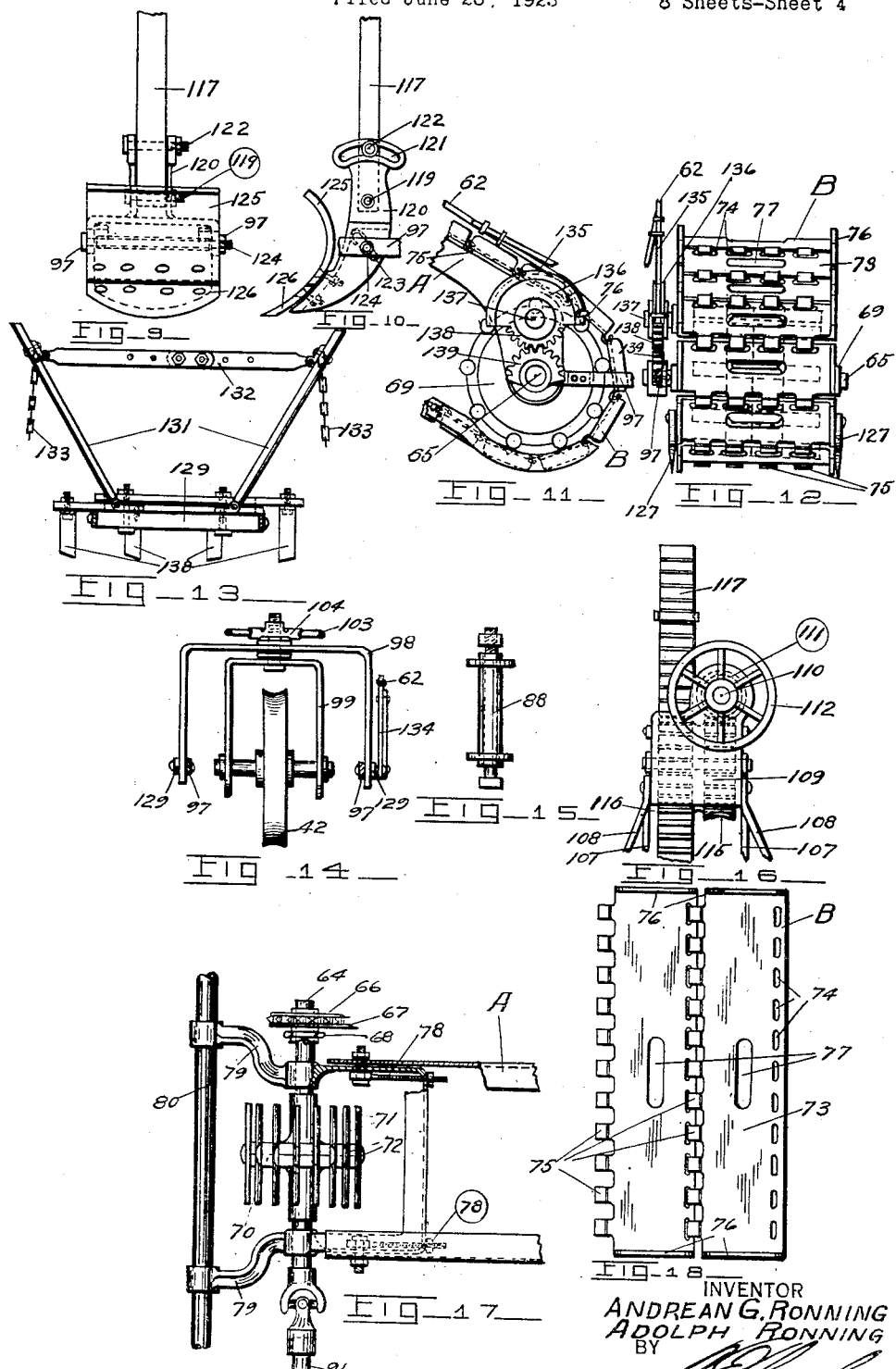

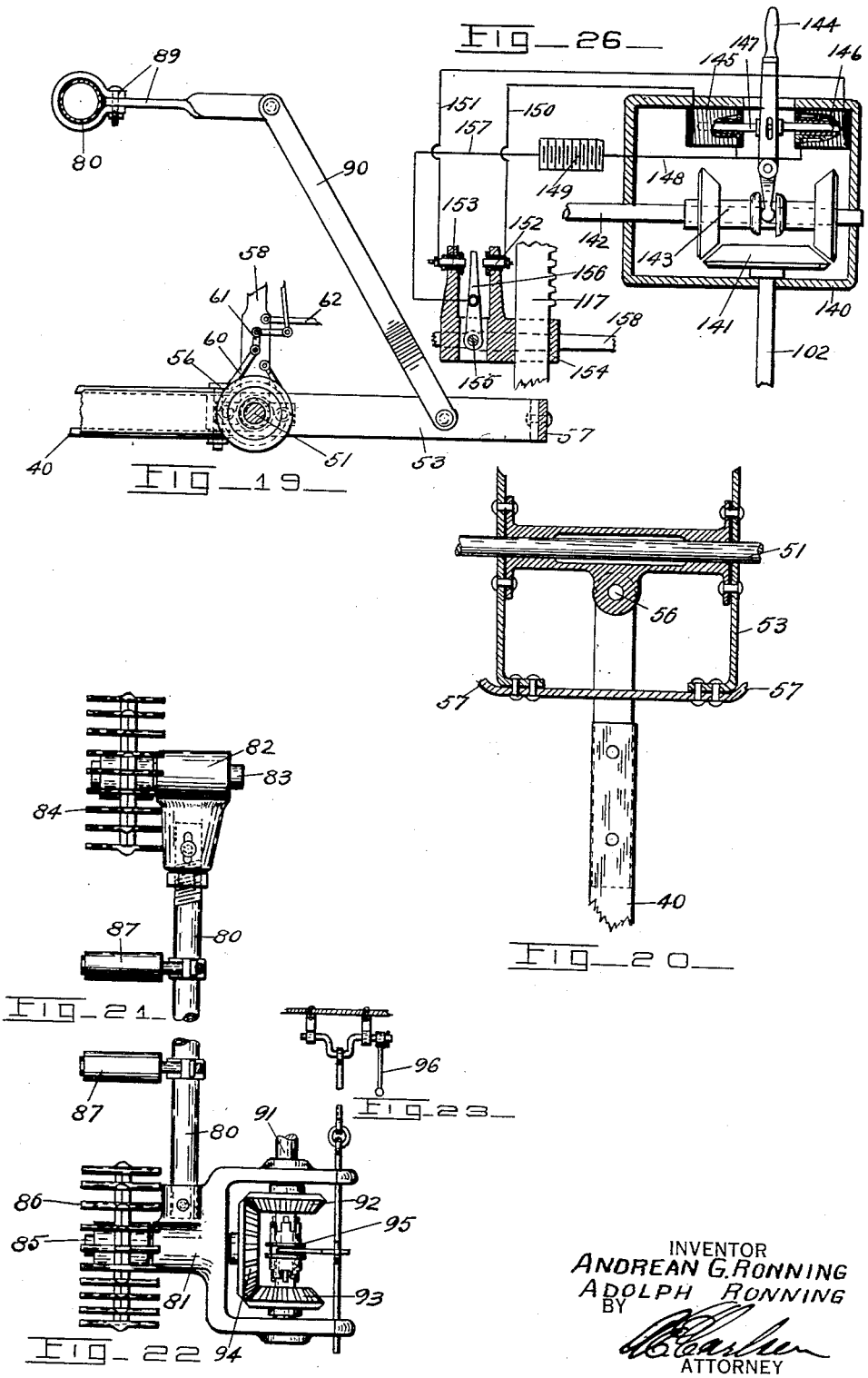

July 15, 1924.
A. G. RONNING ET AL
1,501,621
DITCHING MACHINE
Filed June 23, 1923
8 Sheets-Sheet 6
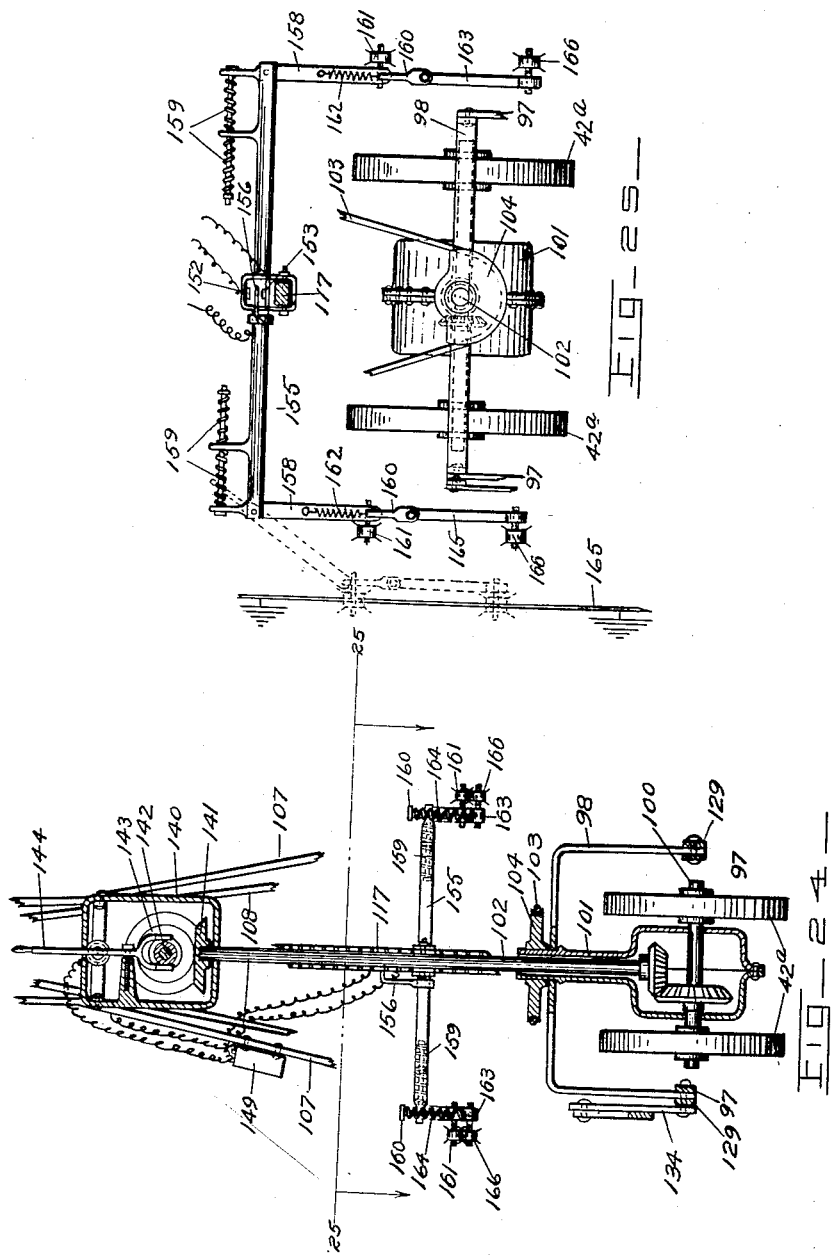
INVENTOR
ANDREAN G. RONNING
ADOLPH RONNING
BY
ATTORNEY

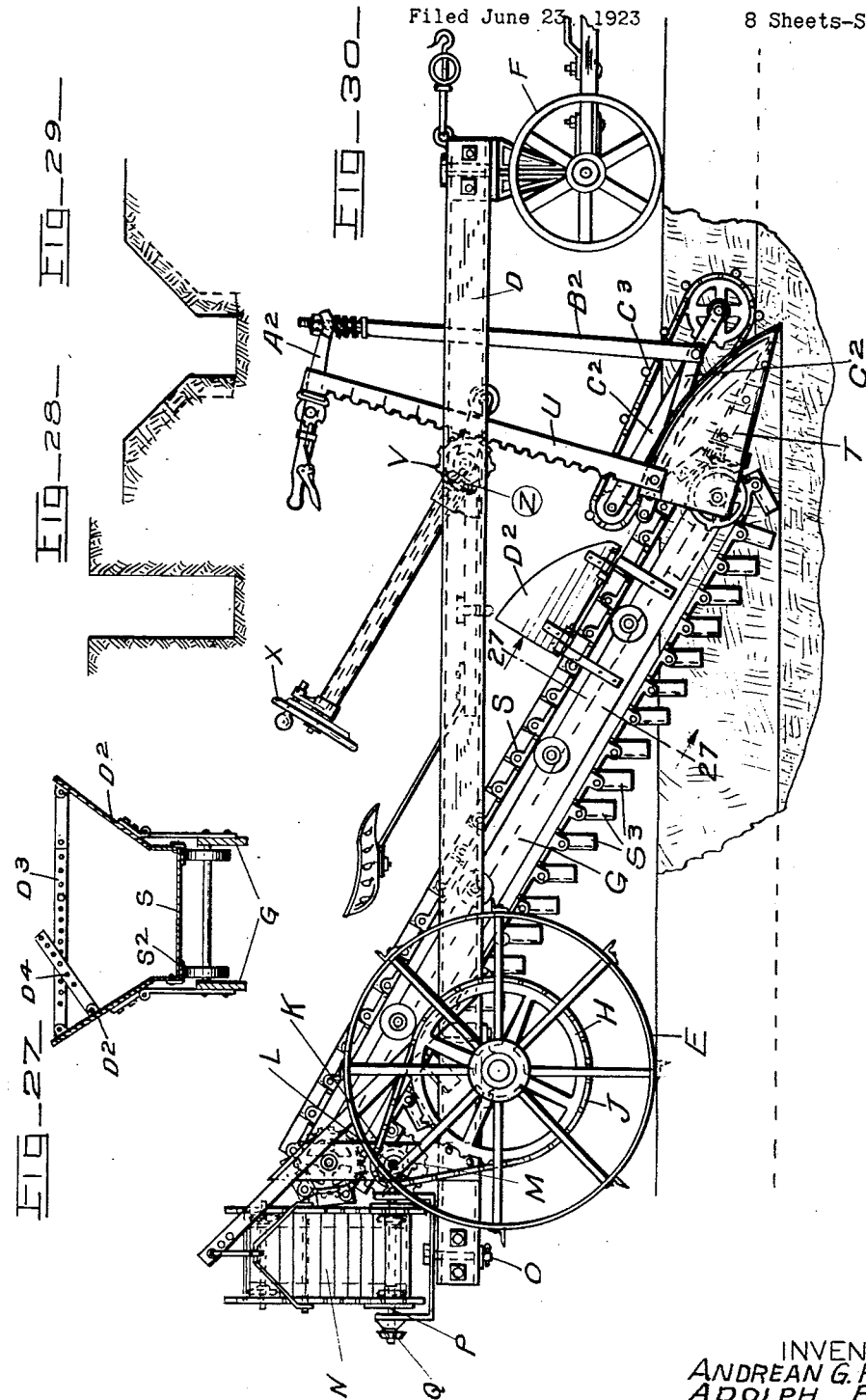

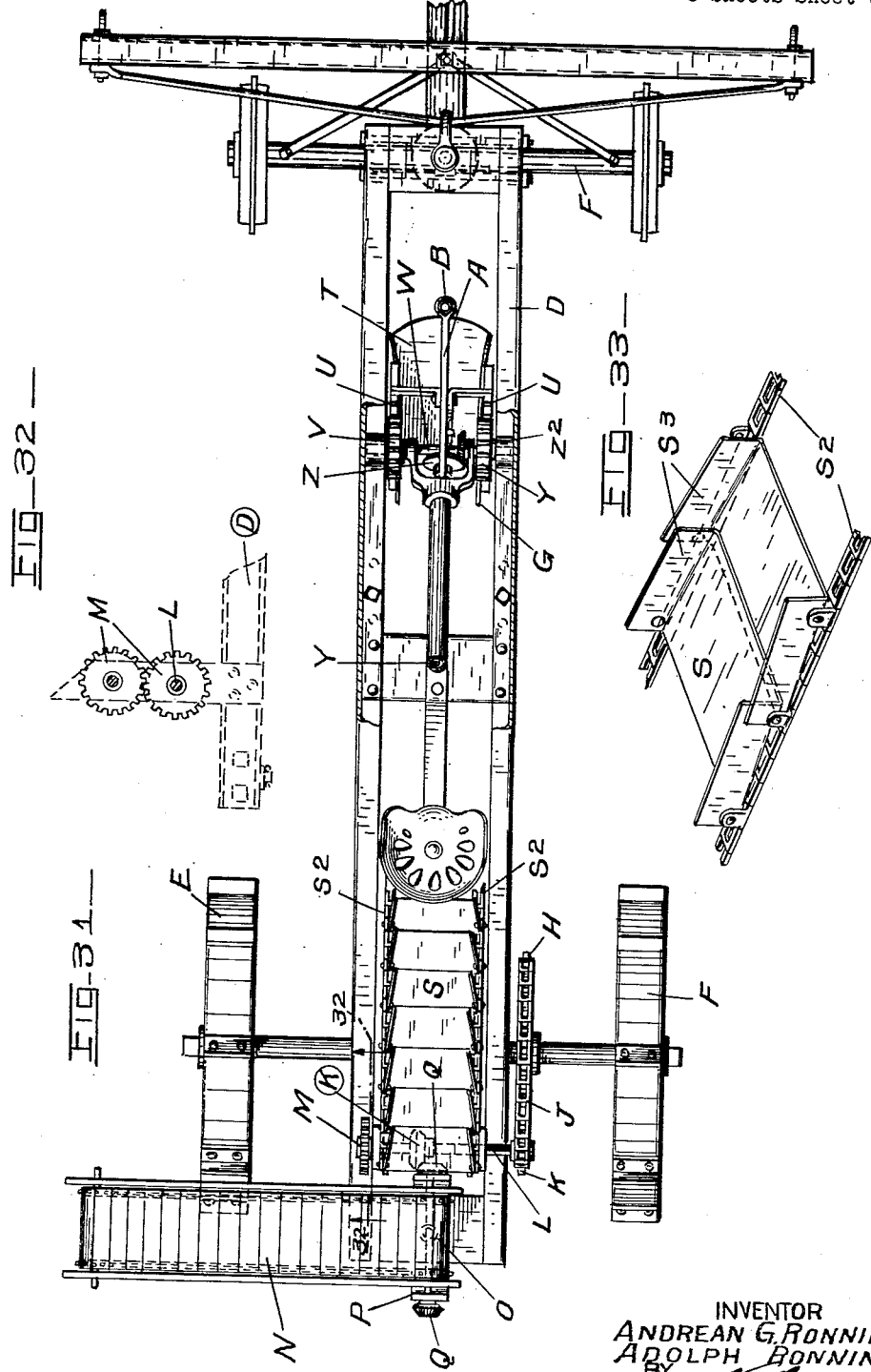

Patented July 15, 1924.

1,501,621

UNITED STATES PATENT OFFICE.

ANDREAN G. RONNING AND ADOLPH RONNING, OF MINNEAPOLIS, MINNESOTA.

DITCHING MACHINE.

Application filed June 23, 1923. Serial No. 647,369.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Ditching Machines, of which the following is a specification.

This invention relates to ditching and trenching machinery, and the main object is to provide an efficient, practical and comparatively simple and light machine for digging ditches and trenches such as are used for drainage, sewerage and pipe line purposes. A further object is to provide improved means whereby the dirt excavated from the ditch may be readily carried to either side thereof as it is removed in successive layers, so that the various strata of earth may be replaced either in their original or in exchanged relations, as various circumstances may require. A further object is to provide automatic means whereby the machine will dig a ditch wherein the bottom will conform to a certain predetermined line, or grade, regardless of the vertical contour or surface condition of the ground upon which the machine travels. Further and more specific objects will be disclosed and described in the following specification, the machine embodying the invention being illustrated in the accompanying drawings, wherein:—

Fig. 1 is a side elevation of a ditching machine embodying the preferred construction of the invention, the near front wheel being removed.

Fig. 2 is a plan view of the machine.

Fig. 3 is a cross sectional elevation, as seen on the line 3—3 in Fig. 1.

Fig. 4 is an enlarged face view of a clutch mechanism, later to be described.

Fig. 5 is an edge elevation of the clutch shown in Fig. 4.

Fig. 6 is an enlarged diametrical sectional view through one of the traction wheels and its mounting, fractional portions being broken away.

Fig. 7 is an enlarged detail view of the carrier clutch.

Fig. 8 is a view of the clutch shown in Fig. 7, as seen from the left.

Fig. 9 is a detail face elevation of the digging shovel and its mounting.

Fig. 10 is a side elevation of the shovel construction shown in Fig. 9.

Fig. 11 is an enlarged detail side view of the lower end of the longitudinal carrier.

Fig. 12 is a rear elevation of the carrier portion shown in Fig. 11.

Fig. 13 is a detail view of the inclined reaming members, as seen substantially on the line 13—13 in Fig. 1.

Fig. 14 is a detail elevation of the rear supporting wheel and its mounting.

Fig. 15 is a detail of one of the rollers 88, supporting the upper run of the apron B.

Fig. 16 is a rear detail elevation of the manually operated depth adjusting device.

Fig. 17 is an enlarged detail plan view of the upper end of the carrier frame, a fractional portion thereof and the endless apron being removed, for illustration purposes.

Fig. 18 is an enlarged detail view of two of the apron sections.

Fig. 19 is a detail view of part of the main frame construction.

Fig. 20 is an enlarged detail sectional plan view of the draw-bar construction.

Fig. 21 is an enlarged detail view of one end of the transverse carrier frame.

Fig. 22 is an enlarged detail view of the other end of the transverse carrier frame, showing the adjacent reversible driving mechanism.

Fig. 23 is a detail view of the lever device adapted to control the reversible clutch shown in Fig. 22, and in proper relative position thereto.

Fig. 24 is a (slightly modified) sectional elevation as seen substantially on the line 24—24 in Fig. 1.

Fig. 25 is a plan elevation, about as on the line 25—25 in Fig. 24, showing the relative arrangement of the rear truck and the elevation adjusting devices.

Fig. 26 is a diagrammatical and sectional detail view of the electrical apparatus used in connection with the depth adjuster.

Fig. 27 is a detail section as seen substantially on the line 27—27 in Fig. 30.

Fig. 28 illustrates a sectional elevation of a ditch as made by the ditcher under ordinary circumstances.

Fig. 29 illustrates an open ditch section in which the corners are reamed or cut off by my improved reaming devices.

Fig. 30 is an elevation of our improved ditcher showing certain modifications thereof, not shown in Fig. 1.

Fig. 31 is a plan view of the ditching machine shown in Fig. 30.

Fig. 32 is a fractional detail view showing a certain gearing arrangement and mounting, and as seen substantially on the line 32—32 in Fig. 31.

Fig. 33 is a perspective view of a fractional part of an improved type of endless apron, or carrier, adapted to be used in our machine.

The drawings will now be detailed and referred to by reference characters, like characters indicating like parts in the various figures. The first twenty-six figures will first be described.

The machine is of such weight and construction as may be drawn by horses (not shown) hitched to a tongue 40, and is primarily supported upon a pair of front drive wheels 41 and a rear truck wheel 42, or truck wheels 42ª.

The wheels 41 are power-transmitting wheels, and each is preferably formed of a pair of concave disks, whose outer edges are riveted or bolted together, by bolts 43, which bolts also pass through and secure to the wheel lugs 44. These lugs are formed of small angled members, having their traction flanges arranged at their forward ends (at the bottom of the wheel), so as to be better braced for the duty required of them. Each wheel 41 is provided with a hub 45 (see Fig. 6), in which is rigidly fixed a stub shaft 46, journaled in a bearing member 47, which in turn is mounted to swing on a vertical pivot 48, in a stationary collar 49. The stub shafts 46 are connected by universal joints 50 to a main shaft 51. Spring-held differential clutches 52 are provided on the shaft 51, so as to keep it in constant driving relation with a sprocket gear 55 and clutch drum 54. The main shaft is journaled in the collars 49 of the draft frame 53, and carries a clutch drum 54 and a sprocket gear 55. The tongue 40 is pivotally connected to the frame 53, as at 56. The frame 53 is rigidly connected to the collars 49 by extensions 57. A hand lever 58 is pivotally mounted on the shaft 51, adjacent to the drum 54, and is provided with a finger member 59 operating a band 60, through a bell crank lever 61, so that when the machine is moving and the member 59 is clamped, by the operator, the rotation of the shaft will tend to pull the lever forward, and pull a cable 62, for a purpose later to be described.

A longitudinally arranged inclined conveyor A is mounted above and suitably secured by braces 63, above the draft frame 53, and is tiltable upon an axis coinciding with the center of the main shaft, or axle 51—52ª. The conveyor is provided with an upper driving shaft 64 and a lower idle shaft 65. A sprocket gear 66, is driven by a chain 67, also passing over the gear 55, and is thrown in and out of driving engagement with the shaft 64 by a small hand clutch 68.

The shafts 65 and 64 are respectively provided with circular apron frames 69 and 70, over which is stretched an endless apron, or carrier B. The cross members 71 of the frame 70 are provided with lugs 72 to engage and drive the apron sections.

The apron B is made up of an endless series of linked sections, each of which consists of a flat member 73, having holes 74 punched near one edge to receive bent-up integral hooks or fingers 75 of the opposite edge of the adjacent section (see especially Fig. 18). Each section is further provided with an angular end extension 76, and has a central aperture 77 engageable by a lug 72. The conveyor frame A is adjustable as to length, as shown at 78 in Fig. 17, so that the apron may be given the proper operating tension.

The frame A is provided with a pair of rigidly disposed forwardly projecting extension brackets 79, in which is rotatably retained a transverse carrier supporting bar 80, having a casting 81 rigidly secured at one end, and a casting 82 adjustably secured on the other end (see Figs. 21 and 22). The casting 82 has a spindle 83, carrying a circular apron frame 84, and the casting 81 has a short shaft 85 carrying a similar apron frame 86. An apron C, similar in construction to apron B, is stretched over the spools or frames 84, 86, its upper run also being supported, at intervals, by rollers 87, in the same manner as the upper run of the apron B is carried on rollers 88.

In order that the upper run of the carrier will always operate in a horizontal plane, we provide a bracket 89 (see especially Fig. 19) rigidly secured at one end to the bar 80, while its other end is connected by a link rod 90, to the draft frame 53. Thus, if the elevator A is tilted, so that its upper end and the bracket 79 are raised or lowered, the action of the rod 90 will retain the conveyor C in its proper relative position to receive material from the elevator A. The shaft 85, of the conveyor C, is driven from the shaft 64, of the elevator B, through the medium of a universally jointed shaft 91 and bevel gears 92, 93 and 94, the last named being rigid on the shaft 85. The gears 92 and 93 are selectively rendered actively engageable with the gear 94, by a clutch mechanism 95 (of any common construction), manually operated by a hand lever 96; so that the direction of the conveyor can be readily changed, depending upon which side of the ditch it is desired to deposit the dirt dug therefrom.

The shaft 65, supporting the rear end of the elevator A, is carried in a frame 97, having a rear upward extension 98, in which is vertically journaled the yoke 99 of the wheel 42. In Figures 1, 24 and 25, the rear truck construction is modified to include the two wheels 42ª, whose common shaft 100 is journaled in a housing 101, which in turn is journaled vertically in the frame portion 98. The horizontal shaft 100 is geared to a vertical shaft 102, extending up through the housing 101, for a purpose soon to be described. The steering of the rear truck is accomplished by means of a cable 103, passing over a grooved segment 104 (rigid with said truck). The front ends of a transverse foot lever 105, adapted to be engaged by the feet of the operator when sitting in the seat 106.

The frame 97 is further provided with two pairs of upright bars 107 and 108, to the upper ends of which is rigidly secured a casting 109. A shaft 110 having a worm 111 and a universal sliding joint 110ª, is journaled in the member 109, and is provided at its ends with handwheels 112 and 113. The front end of the shaft 110 is loosely journaled in a bearing 114, so that it will not bind therein when the front and rear parts of the machine are relatively adjusted.

The worm 111 meshes with a worm gear 115, integral with which is a spur gear 116, meshing with a rack bar 117, slidably retained in a guide 118.

To the lower end of the bar 117 is pivotally secured, as at 119, a casting or frame member 120, having an arched slot 121 in its upper end, engaged by a bolt 122, secured in the bar 117. Below the pivot 119 the member 120 is provided, at its sides, with a pair of similar inclined slots 123, engaged by a bolt 124, secured in the frame 97.

The digging shovel 125 is secured on the member 120, and may be either in one piece, as shown in Fig. 1, or may have a detachable cutting blade 126, as indicated in Figs. 9 and 10. The latter construction is preferable, as it allows cutting blades of different shapes to be used so that the ditch bottom will be formed as desired under different circumstances and for various purposes.

The conveyor frame A is provided, at its lower end, with a pair of laterally arranged cutters or cutting knives 127.

Pivotally secured, as at 128, to the frame 97, is a rear or secondary frame 129, having a series of transversely adjustable ground-breaking tools 130, adapted to break up the earth to be excavated on the succeeding trip of the machine. The frame 129 is further provided with a pair of laterally arranged inclined reaming blades 131, connected by an adjustable bar 132. The blades 131 are braced by a pair of chains 133, and their function is to cut away the corners of the ditch (see Fig. 29) so that the earth will not tend to cave in when it is desired to leave the ditch open, such as is done in some drainage work.

One side of the frame 129 is provided with a vertical braced extension 134, to which is secured the rear end of the cable 62. A spliced extension 135 is secured to, operates in the upper part of, and actuates a member 136, which is trunnioned on a stub shaft 137 of the elevator frame A. This member 136 has a lower toothed sector 138, meshing with a toothed sector 139 rigidly arranged on the frame 97. Thus when the cable 62 is pulled forwardly, as hereinbefore mentioned, to disengage all of the earth engaging members, the action will result in raising the frames 97 and 129 on their common pivot 128, thus lowering the truck frame 98 until the rear end of the machine is supported entirely thereon. To again raise the truck, or drop the earth engaging members, it is only necessary to release the hand lever 58 from the notched holder 139.

The means and mechanism for automatically regulating and adjusting the machine to follow a predetermined ditch bottom level will now be set forth.

The upper end of the vertical shaft 102 is journaled in a box 140, and is provided therewithin with a beveled friction disk 141, adapted to drive a horizontal shaft 142 in either direction, depending upon the position of a double ended friction clutch member 143, which is slidably keyed on the shaft 142. The member 143 is shifted back and forth by a lever 144, which projects through the box 140 for manual operation. The member 143 is normally inoperative, and only temporarily engages the disk 141 when the lever 144 is actuated.

The position of the lever 144 is ordinarily controlled by an electrical device (see especially Fig. 26), consisting primarily of a pair of solenoids 145 and 146, having a common core 147, slidable therein, which core is adapted to actuate the lever 144, back and forth, depending upon which solenoid is energized. A wire 148 connects corresponding terminals of the solenoids to one terminal of a battery 149, while the opposite terminals of the solenoids are respectively connected by wires 150 and 151 to binding posts 152 and 153. The posts 152, 153 are insulated from and secured in the spaced arms of a bracket member 154, which is movable, to be secured in any desired vertical position, on the bar 117. A horizontal transversely arranged bar 155 is rotatable in the member 154, and is provided with a vertical finger 156, interposed between the contacts 152 and 153. The finger is connected by a wire 157 to the other battery terminal, so that when the finger is tipped to touch the post 152 the solenoid 145 will be energized, and when it contacts with the post 153, then the solenoid 146 will be energized.

To the outer ends of the bar 155 are pivoted a pair of normally horizontal levers 158, which are yieldingly retained in longitudinal direction with respect to the machine by springs 159. Bent levers 160 are pivoted to the rear ends of the levers 158 (on transverse pivots) and have spools 161 at their lower ends, while their upper ends are yieldingly connected by pulling springs 162 to the levers 158. Levers 163 are pivoted to the lower ends of the bent levers 160 and are normally held up by pulling springs 164. The spools 161 are designed to ride on the top of guide wires 165, while spools 166, at the rear ends of the levers 163, bear upward against the wires 165 by reason of said springs 162 and 164. The wires 165 are stretched along the route of the ditch and may be secured on pegs or posts, or when the ditch is deep enough may even be tacked on the side walls of the ditch. They must, of course, be free from vertical obstructions so as not to interfere with the travel of the spools 161 and 166. These spools are, however, provided with radial guide fingers to prevent accidental displacement of the spools from the wire.

The front end of the clutch shaft 142 has a sprocket gear 167 connected by a chain 168 to a sprocket gear 169 on the worm shaft 110.

The upper end of the shovel bar 117 may be provided with gauge marks 170, and a spring retained clip 171, so that the depth of the shovel 125 in the ground may readily be determined, or, if a ditch of a certain depth is to be dug, the gauge clip 171 may be set, and as soon as it descends to the ground surface, then dipping will be discontinued.

The use and operation of the machine illustrated in Figs. 1 to 26, inclusive, will now be briefly set forth.

As the machine is drawn along over the ground by horses, or other suitable traction power, the wheels 41 will operate the elevator apron B through the elements 46, 50, 51, 52, 52ª, 55, 67, 66, 64 and 70, and the transverse conveyor C will be operated through the elements 64, 91, 92 (or 93), 94, 85 and 86. As the cutters 127 and the shovel 125 cut and loosen the dirt, the same is forced up between the shovel and the apron B, and is carried up by the latter until it drops on the conveyor C, and is deposited on either side of the ditch desired, depending upon the position of the clutch lever 96. If too much or too little dirt is being dug the desired adjustment may be manually made by turning either hand wheel 112 or 113. Thus, if too shallow a cut is being made, the bar 117 is lowered. This will also lower the shovel 125, and by reason of the inclined slots 123, the shovel will, by the same action, be spaced further away from the elevator apron, so as to allow the thicker layer of dirt to pass between the shovel and the apron. In some instances it may be found desirable or necessary to adjust the angle of the member 120, by loosening the bolt 122.

The vertical adjustment of the shovel 125 is also automatically accomplished by the electrical apparatus which has already been described. In this event, when the ground surface causes an appreciable vertical variance of the machine with the wires 165, the spools 161 and 166 will correspondingly rise or fall, with respect to the machine. When this occurs a contact will be made by the member 156 and one of the posts 152 or 153, thus completing a circuit through one of the solenoids 145 or 146. And when this is done the clutch 143 is rendered active, causing the ground wheels 42ª to move the bar 117, through the successive elements 100, 102, 141, 143, 142, 167, 168, 169, 110, 111, 115 and 116.

In the modified machine shown in Figs. 27, 30, 31, 32 and 33, the main frame D is carried on rear traction wheels E and a small tongue truck F. The elevator frame G inclines rearwardly instead of forwardly, as in Figs. 1 and 2, and is driven by the wheels E, through medium of a sprocket gear H, a chain J, a pinion K on a shaft L and a pair of sprocket gears M. The side conveyor N extends out from a pivot O, and has a shaft P with bevel pinions Q at its ends for engagement with a bevel pinion R keyed on the shaft L, the pinion Q engaged depending upon which side of the machine the conveyor N is to deliver the dirt received from the elevator apron S.

A shovel T is mounted on the lower end of the elevator G, and its depth is regulated by a pair of rack bars U, engaging spur gears V on a shaft W, rotated by a hand wheel X on a shaft Y, having a bevel gear Z meshing with a bevel gear $Z^2$ on the shaft W. At the upper end of the bars V is pivotally and adjustably secured a hand lever $A^2$, in whose front end is slidably retained and downwardly spring held a bar $B^2$, whose lower end is secured to an apron frame $C^2$, having an endless apron $C^3$, adapted to travel over the layer of ground being excavated, and tends to impel it up onto the elevator apron as the machine moves forward. The frame $C^2$ is connected by link bars $C^4$ to the shovel.

A pair of reamers $D^2$ are pivotally mounted on the elevator G, for cutting off the ditch corners as shown in Fig. 29, and are connected and held rigid in any desired position by an adjustable cross bar D³ and a short connecting link D⁴.

The elevator apron S consists of a pair of endless chains S², on which are secured overlapping apron sections S³. These sections have vertical flanges whose forward ends are pivoted to the chains. The sections are wider at their forward ends than at their rear ends so that the sections will interlock on the upward run of the conveyor.

It is understood that suitable modifications may be made in the general design and structural details of the invention, as herein set forth, provided, however, that such modifications come within the spirit and scope of the appended claims.

Having now therefore fully shown and described our invention what we claim to be new and desire to protect by Letters Patent is:

1. The combination in a ditching machine, of a suitably mounted forwardly inclined elevator, means for receiving material from the elevator and delivering same to either side of the machine selectively, a curved shovel arranged rearwardly of and in spaced relation to the rear end of the conveyor, and means for simultaneously raising and lowering said shovel and the lower end of the elevator.

2. The combination in a ditching machine having an inclined elevator, of a shovel arranged near the lower end of the elevator, said shovel being curved so that its face will be uniformly spaced from the end of the elevator, means for lowering and raising the shovel with respect to the elevator, and means, operative upon actuation of the first mentioned means, for correspondingly opening and closing the space between said shovel and elevator.

3. The combination in a ditching machine, of a suitably mounted forwardly inclined elevator, means for receiving material from the elevator and delivering same to one side of the machine, a curved shovel arranged rearwardly of and in spaced relation to the rear end of the conveyor, means for adjusting the cutting depth of the shovel, and means for simultaneously and correspondingly adjusting its spaced position with respect to the elevator.

4. In a wheel supported ditching machine having an excavating device, of electro-magnetically controlled means for vertically adjusting the excavating device with respect to the supporting wheels when said wheels fluctuate vertically while moving over the ground.

5. In a wheel supported ditching machine having a horizontally operating excavating device, of means for adjusting the working depth of said device, and electro-magnetically controlled means for actuating said adjusting means, said electro-magnetically controlled means becoming operative by relative vertical movements of the supporting wheels with respect to a predetermined ditch bottom grade.

6. In a wheel supported ditching machine having a horizontally operating excavating device, of means for adjusting the working depth of said device, a line wire supported in a parallel position with respect to the proposed ditch bottom, and means, operative by a vertical movement of the supporting wheels with respect to said wire, to actuate said adjusting means, and a forwardly inclined elevator connected at its rear end to said excavating device.

7. In a wheel supported ditching machine having a horizontally operating excavating device, of means for adjusting the working depth of said device, a line supported in a longitudinal direction with respect to the ditch, and an electro-magnetically controlled device for actuating said adjusting means, to maintain said excavating device in a parallel relation with respect to said line.

8. In a ditching machine, the combination of an inclined elevator tiltably supported upon a pivot corresponding to the axis of a pair of front wheels, a digging device at the lower end of the elevator, and movable horizontally therewith, to remove a layer of dirt and place it on the elevator, and means for adjusting said device with respect to the elevator, to vary the thickness of said layer of dirt.

9. In a ditching machine, the combination of an inclined elevator tiltably supported to swing from the common axis of a pair of supporting wheels, a digging device at the lower end of the elevator, and movable horizontally therewith, to remove a layer of dirt and place it on the elevator, means for adjusting the device to vary the thickness of said layer of dirt, and means, rigid with the elevator, to cut the sides of the layer.

10. The combination with a ditching machine having means, horizontally movable together with the machine, to cut and elevate successive layers of dirt, to form a ditch, laterally arranged inclined reamers, to cut away the dirt adjacent to the upper corners of the ditch, said reamers being tiltably secured upon pivots, and means for rigidly securing the reamers in adjusted positions.

11. The combination with a ditching machine having means, horizontally movable together with the machine, to cut and elevate successive layers of dirt, to form a ditch, outwardly extending inclined cutting device pivotally connected to the machine, and means for adjusting said devices.

12. In a ditching machine, the combination of a tiltably mounted wheel supported elevator, an excavating device at the lower end thereof, a transversely arranged conveyor adapted to receive material from the elevator, and means for retaining the upper run of the conveyor in a horizontal plane when the elevator is tilted.

13. The combination in a ditching machine, of a transversely arranged conveyor, elevating means for conveying dirt from a ditch onto said conveyor, said conveyor being mounted upon a pivot arranged transversely with respect to the machine, and means to adjust the conveyor, on said pivot, to retain the upper run thereof in a horizontal plane at all times.

14. In a ditching machine, the combination of a tiltably mounted wheel supported elevator, an excavating device at the lower end thereof, a transversely arranged conveyor adapted to receive material from the elevator, means for tilting the conveyor on a transverse pivot with respect to the elevator, and a flexible power connection between the elevator and the conveyor.

15. The combination in a ditching machine, of a front truck, a normally horizontal draft frame connected therewith, a transverse conveyor mounted on a transverse pivot with respect to the machine, means for elevating material from a ditch to the conveyor, said means being tiltable with respect to the truck, and operative connection between the conveyor and the draft frame to retain them in parallel planes when the elevating means is tilted.

16. The combination in a ditching machine, of a normally horizontal draft frame, a tiltably mounted longitudinally arranged elevator, a transverse conveyor arranged on a transverse fixed pivot with respect to the elevator, and a connection between the draft frame and the conveyor to normally hold the latter with its upper run in a horizontal plane.

17. The combination in a ditching machine, of a normally horizontal draft frame, a tiltably mounted longitudinally arranged elevator, a transverse conveyor arranged on a transverse fixed pivot with respect to the elevator, and a link bar connecting the draft frame to the conveyor.

18. In a ditching machine, the combination of an elevator tiltably mounted on wheels adapted to travel on the ground at the sides of the ditch, a rear frame supported on wheels adapted to travel in the ditch, and a pivotal connection between said frame and the rear end of the elevator.

19. In a ditching machine, the combination of an elevator tiltably mounted on wheels adapted to travel on the ground at the sides of the ditch, a rear frame supported on wheels adapted to travel in the ditch, horizontally operating means adjacent to the lower end of the elevator to deliver material thereto from the bottom of the ditch, and means to adjust the space between said shovel and endless means.

20. In a ditching machine, the combination of an elevator tiltably mounted on wheels adapted to travel on the ground at the sides of the ditch, means adjacent to the lower end of the elevator to feed material thereto from the bottom of the ditch, a wheel supported frame carrying said means and pivotally secured to the lower end of the elevator.

21. In a ditching machine, the combination of an elevator tiltably mounted on wheels adapted to travel on the ground at the sides of the ditch, means adjacent to the lower end of the elevator to feed material thereto from the bottom of the ditch, a wheel supported frame carrying said means and pivotally secured to the lower end of the elevator, and means for raising said frame with respect to the supporting wheels of the machine, to render said elevator feeding means inoperative.

22. In a ditching machine having an inclined tiltably mounted elevator, a wheel supported frame pivotally secured to the lower end of the elevator, and normally operative in a horizontal position, and means secured to said frame adjacent to the lower end of the elevator for conveying material from the bottom of the ditch onto the elevator.

23. In a ditching machine, the combination with front and rear supporting wheels, of an elevator tiltably mounted with respect to the front wheels, a frame tiltably mounted with respect to the rear wheels, said frame being pivotally connected to the lower end of the elevator, and a shovel arranged adjacent to the lower end of the elevator to deliver material thereto from the bottom of the ditch.

24. In a ditching machine, the combination with front and rear supporting wheels, of an elevator tiltably mounted with respect to the front wheels, a frame tiltably mounted with respect to the rear wheels, said frame being pivotally connected to the lower end of the elevator, a digging device on the frame, and means for raising the connected ends of the frame and elevator, whereby the digging device and the elevator will be rendered inoperative.

25. In a ditching machine, the combination of a suitable supported inclined elevator, a rear truck, a frame pivotally secured at one end to the lower end of the elevator, and at its other end to said truck, a digging device connected to said frame, ground-breaking devices arranged rearwardly of the truck and means for simultaneously raising or lowering the digging and breaking devices with respect to the truck.

26. In a ditching machine, the combination of a suitable supported inclined elevator, a digging device arranged adjacent to the lower end of the elevator, breaking tools arranged rearwardly of the digging device, supporting wheels arranged between said device and tools, and means for raising the lower end of the elevator, the digging device and said tools, simultaneously, with respect to said supporting wheels.

27. In a ditching machine, the combination with front and rear supporting wheels, of an elevator tiltably mounted with respect to the front wheels, a frame tiltably mounted with respect to the rear wheels, said frame being pivotally connected to the lower end of the elevator, a digging device on the frame, and manually controlled means actuated by the front wheels, to raise the connected ends of said frame and elevator with respect to the rear wheels.

28. In a ditching machine, a suitable support, an elevator boom tiltably mounted upon said support and having a relatively long portion extending rearwardly therefrom, and a conveyor carried by the comparatively short front end of the boom, and forwardly of its tilting axis, to receive material therefrom and convey it laterally with respect to the ditch.

In testimony whereof we affix our signatures.

ANDREAN G. RONNING.
ADOLPH RONNING.